United States Patent
Bencheck et al.

(10) Patent No.: US 9,948,497 B2
(45) Date of Patent: Apr. 17, 2018

(54) SYSTEM FOR AND METHOD OF AUTOMATICALLY DISCOVERING AND CONFIGURING NIDS

(71) Applicant: Verizon Patent and Licensing Inc., Basking Ridge, NJ (US)

(72) Inventors: Michael U. Bencheck, Richardson, TX (US); Matthew W. Turlington, Richardson, TX (US); Vincent A. Alesi, Yorktown Heights, NY (US); Richard Schell, Allen, TX (US); William F. Copeland, Garland, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1010 days.

(21) Appl. No.: 13/836,704

(22) Filed: Mar. 15, 2013

(65) Prior Publication Data

US 2014/0280807 A1 Sep. 18, 2014

(51) Int. Cl.
*H04L 12/24* (2006.01)

(52) U.S. Cl.
CPC ...... *H04L 41/0213* (2013.01); *H04L 41/0809* (2013.01)

(58) Field of Classification Search
CPC ............ H04L 12/4645; H04L 12/4641; H04L 12/4654; H04L 12/4658; H04L 12/467; H04L 41/0803; H04L 41/0886; H04L 12/465; H04L 41/0879; H04L 41/08; H04L 41/085; H04L 41/0853
See application file for complete search history.

(56) References Cited

U.S. PATENT DOCUMENTS

| | | | | |
|---|---|---|---|---|
| 8,402,120 B1* | 3/2013 | Perkinson | ............... | H04L 67/16 370/254 |
| 8,443,065 B1* | 5/2013 | White | ..................... | H04L 45/02 370/254 |
| 2005/0163118 A1* | 7/2005 | Steindl | ............. | H04L 29/12254 370/389 |
| 2008/0013547 A1* | 1/2008 | Klessig | .................. | H04L 12/66 370/395.53 |
| 2008/0109539 A1* | 5/2008 | Foster | ............... | H04L 29/12273 709/221 |

(Continued)

OTHER PUBLICATIONS

Mizrahi et al.; An Overview of Operations, Administration, and Maintenance (OAM) Mechanisms; Jan. 9, 2013; IETF; pp. 1-33.*

*Primary Examiner* — Michael Y Won
*Assistant Examiner* — Muhammad Raza

(57) ABSTRACT

A system for and method of automatic discovery and configuration of network interface devices is presented. A network interface device (NID) may be included a pre-configured maintenance entity end point (MEP), whereby upon use, the NID may begin sending at least one discovery message to a provider edge device, each discovery message including an organizationally unique identifier. The provider edge device may strip the discovery message(s) to determine the message content, which may then be forwarded to a NIS management system. The NID management system may then identify an identification number of the NID, determine where the NID is installed and send any configuration data to the NID via the provider edge device to configure the NID.

22 Claims, 4 Drawing Sheets

(56) References Cited

U.S. PATENT DOCUMENTS

| | | | |
|---|---|---|---|
| 2008/0301273 A1* | 12/2008 | Brown | H04L 29/12283 |
| | | | 709/222 |
| 2009/0046657 A1* | 2/2009 | Kim | H04W 36/005 |
| | | | 370/331 |
| 2010/0322092 A1* | 12/2010 | Yu | H04L 25/03012 |
| | | | 370/252 |
| 2011/0142045 A1* | 6/2011 | Ait-Ameur | H04L 12/4641 |
| | | | 370/392 |
| 2011/0292921 A1* | 12/2011 | Hunter | H04L 45/74 |
| | | | 370/338 |
| 2012/0063363 A1* | 3/2012 | Li | H04L 12/4645 |
| | | | 370/255 |
| 2012/0215874 A1* | 8/2012 | Sequeira | H04L 12/12 |
| | | | 709/208 |
| 2014/0052830 A1* | 2/2014 | Bigall | H04L 41/0803 |
| | | | 709/220 |
| 2014/0334822 A1* | 11/2014 | Hajduczenia | H04L 12/2876 |
| | | | 398/58 |
| 2015/0006689 A1* | 1/2015 | Szilagyi | H04L 41/0886 |
| | | | 709/222 |
| 2015/0263892 A1* | 9/2015 | John | H04L 41/0806 |
| | | | 370/236.2 |

* cited by examiner

SYSTEM FOR AND METHOD OF AUTOMATICALLY DISCOVERING AND CONFIGURING NIDS

BACKGROUND INFORMATION

Network interface devices (NIDs) that support network services rely on statically provisioned addresses, which must be manually set by field technicians. A ND may be a device that serves as a demarcation point between the carrier's local loop and the customer's on-premises wiring. The manual setting of addresses, such as Internet Protocol (IP) addresses, may be problematic for those skilled in the art due to the length and complexity of the addresses. More specifically, the manual setting of IP addresses with IPv4 is challenging due to the time and potential errors that may occur in manual configuration. With the longer address scheme of IPv6, the manual setting of IPv6 addresses poses an even great challenge with respect to the amount of time it takes to set the addresses and the potential for human error. Significant overhead and other costs may be associated with configuring and monitoring NIDs. These and other drawbacks exist.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Figure 1:
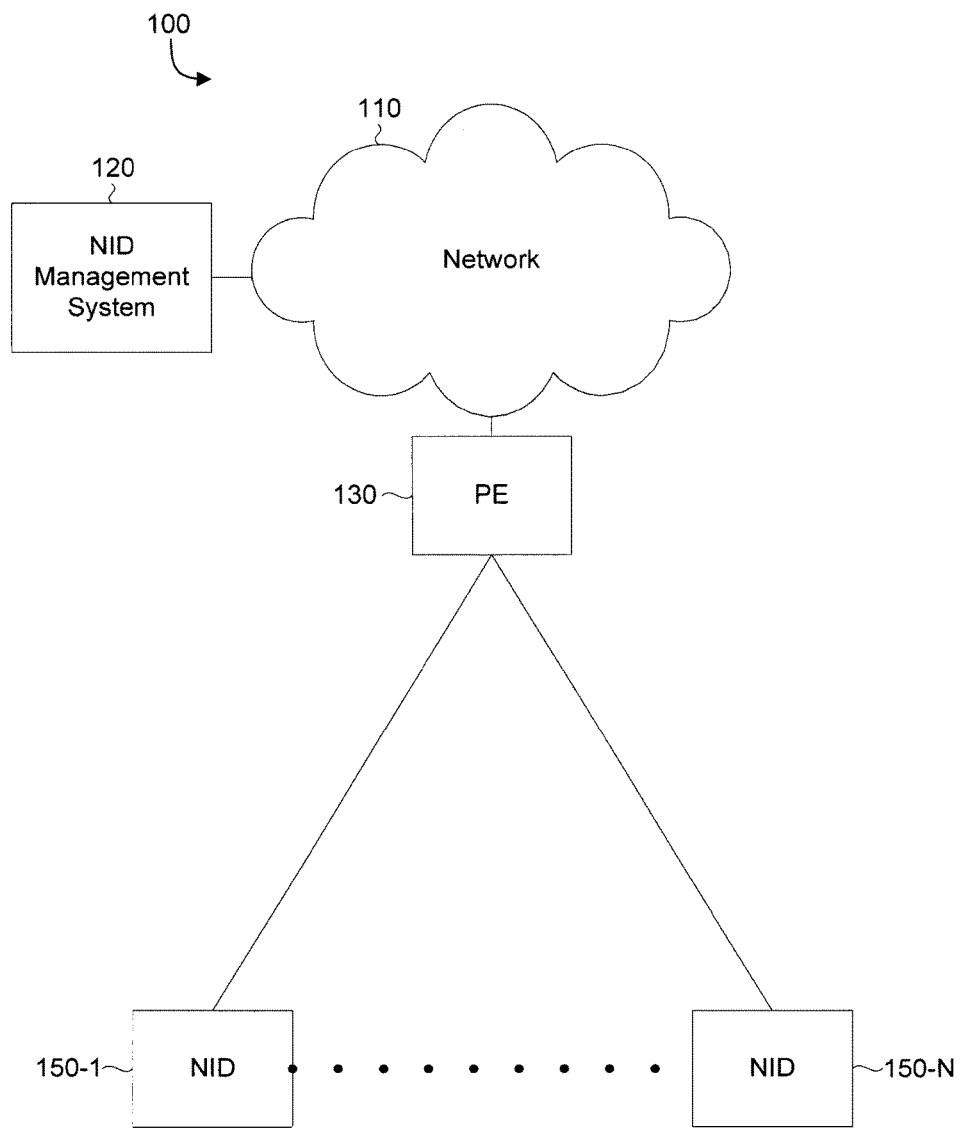
FIG. 1 is a schematic diagram illustrating a network interface device management system according to a particular embodiment.

A system and method may include various exemplary embodiments for automatically discovering and configuring NIDs using Service Operations, Administration and Maintenance (SOAM). OAM may be the processes, activities, tools, and standards involved with operations, administration, and maintenance of a system. SOAM may include fault management and performance monitoring, utilizing ITU-T Y.1731, which defines performance monitoring measurements such as frame, loss ratio, frame delay, and frame delay variation. Moreover, SOAM may include connectivity fault management, utilizing IEEE 802.1ag, which defines standardized continuity checks, loopbacks, and link trace for fault management capabilities in enterprise and carrier networks. The system and method may include NIDs that are preconfigured with a Maintenance Entity End Point (MEP). The system and method may further include the generation, at each NID, of at least one discovery message, using, for example, Ethernet vendor-specific OAM (ETH-VSP) frames. Vendor specific frames may indicate that a vendor may provide a vendor-specific format for each NID or switch. Moreover, each vendor NID management system will be formatted to communicate with each vendor-specific frame. A discovery message may include at least one frame, for example, an Ethernet frame that may include a preamble and/or start frame delimiter, an Ethernet header featuring destination and source MAC addresses, payload data including any headers for other protocols carried in the frame, any serial number data, and/or a 32-bit cyclic redundancy check. Each NID may then transmit the discovery message(s) to a MEP module within a provider edge device.

Each NID may first transmit the discovery message(s) as a predetermined number of untagged frames and wait a predetermined period of time for a response to the transmitted untagged frames. If no response is received, the NID may then transmit the discovery message(s) as a predetermined number of frames with a pre-defined customer tag (C-Tag) VLAN ID. The NID may then wait a predetermined period of time for a response to the transmitted frames having a pre-defined C-Tag VLAN ID. If no response is received, the NID may then transmit the discovery message(s) as a predetermined number of frames with a pre-defined service-provider tag (S-Tag) VLAN ID and a pre-defined C-Tag VLAN ID. The NID may cycle through sending untagged discovery message(s), discovery message(s) with a predefined C-Tag VLAN ID, and discovery messages with both an S-Tag VLAN ID and a C-Tag VLAN ID until a response is received.

The MEP module at the provider edge device may respond to the delivery message(s) and send the response to the NID in the same format sent by the NID. The MEP may also pass the discovery message(s) to a content module, where the frames may be stripped from the discovery message(s) to produce the message content. The message content of the frames may then be forwarded to a NID management system. The NID management system may determine an identification number of the NID based on the message content. Based on the message content and the identification number of the NID, the NID management system may then determine where the NID is installed and the appropriate configuration data for the NID. The NID configuration data may then be downloaded onto the NID, where the configuration data is first passed to the provider edge device and then to the NID. The configuration data may be passed as frames, such as, for example, ETH-VSP frames.

FIG. 1 is a schematic diagram illustrating a NID management system 100 according to particular embodiments. The NID management system 100 may include one or more NIDs 150-1 through 150-N, a provider edge device (PE) 130, and NID management system 120. Although elements of the system 100 may be described as a single device, it will be appreciated that multiple instances of these devices may be included in the system 100, such as, for example, multiple provider edge devices 130, multiple NID management system 120, and/or multiple networks 110.

The provider edge device 130 may reside on the edge of the network 110 and may process and relay data from NIDs 150 and NID management system 120. A provider edge device 130 may include, for example, a router, a switch, and/or a gateway. The NID management system 120 may include, for example, a bus, a processing device, a memory, a storage device, an input device, an output device, and/or a communication interface. The system may further include a network 110 connecting the various components of the system 100.

Network 110 may be a wireless network, a wired network or any combination of wireless network and wired network. For example, network 110 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 110 may include, without limitation, telephone line, fiber optics, IEEE Ethernet 802.3, a wide area network ("WAN"), a local area network ("LAN"), or a global network such as the Internet. Also, network 110 may support, an Internet network, a wireless communication network, a cellular network, or the like, or any combination thereof. Network 110 may further include one, or any number of the exemplary types of networks mentioned above operating as a stand-alone network or in cooperation with each other. Network 110 may utilize one or more protocols of one or more network elements to which it is communicatively coupled. Network 110 may translate to or from other protocols to one or more protocols of network devices. Although network 110 is depicted as one network, it should be appreciated that according to one or more embodiments, network 110 may comprise a plurality of interconnected networks, such as, for example, a service provider network, the Internet, a broadcaster's network, a cable television network, corporate networks, and home networks.

Figure 2:
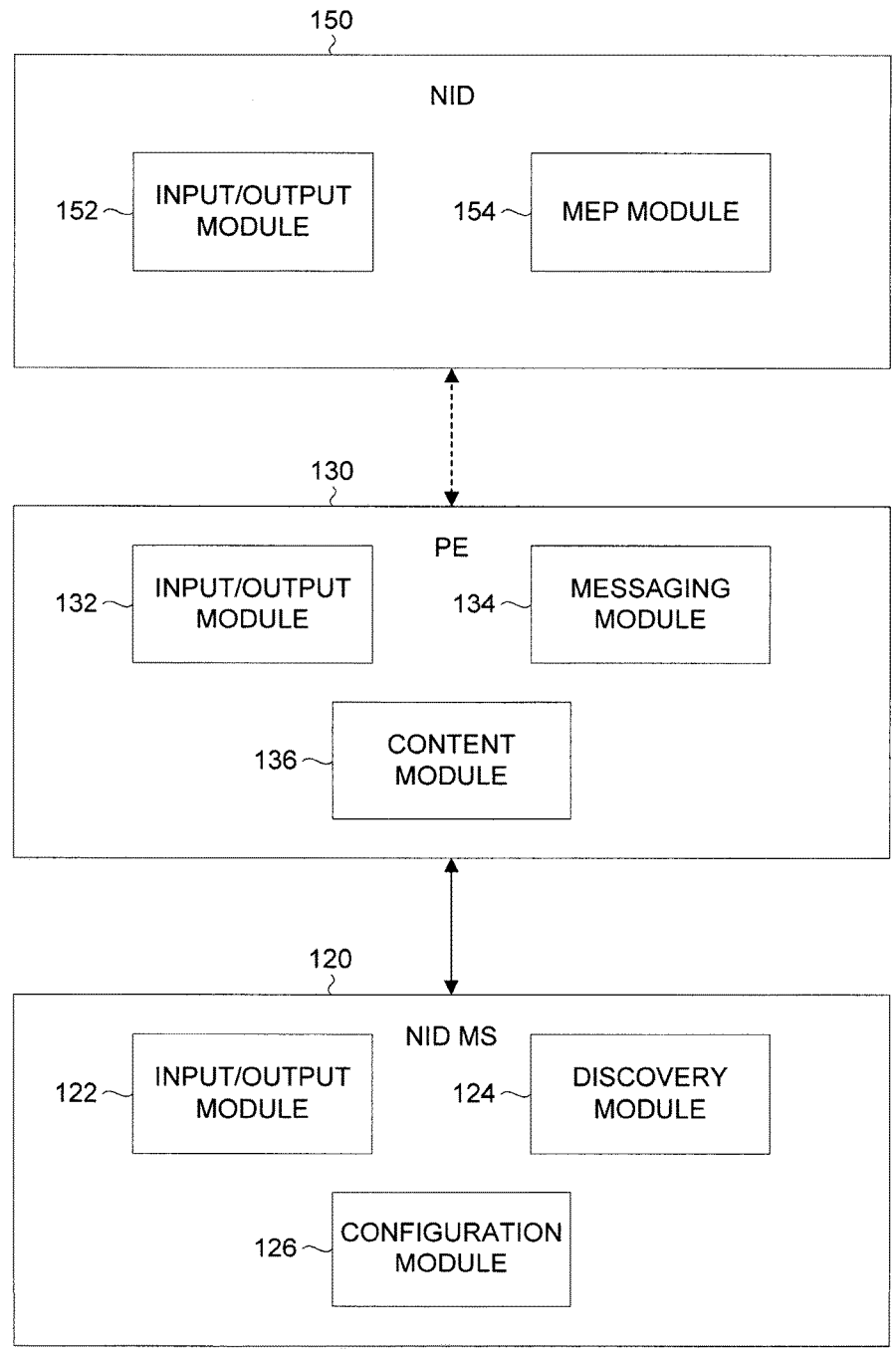
FIG. 2 is a block diagram of hardware components of a network interface device management system of a particular embodiment.

FIG. 2 is a block diagram of hardware components of a network interface device management system of a particular embodiment. Illustrated in FIG. 2 are various components including an exemplary NID 150, an exemplary provider edge device 130, and an exemplary NID management system 120. The components of FIG. 2 may be connected over a network as illustrated in FIG. 1. Moreover, data may be transmitted and received on the NID 150, provider edge device 130, and NID management system 120 wirelessly or may utilize cabled network or telecom connections such as an Ethernet RJ45/Category 5 Ethernet connection, a fiber connection, a traditional phone wireline connection, a cable connection or other wired network connection. Network 110 may use standard wireless protocols including IEEE 802.11a, 802.11b and 802.11g. Network 110 may also use protocols for a wired connection, such as an IEEE Ethernet 802.3.

As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

The NID 150 may include an input/output module 152 for sending and receiving data and an MEP module 154 for generating discovery messages based on a pre-configured MEP. The input/output module 152 may include various hardware and software components, such as, for example, a repeater, a microwave antenna, a cellular tower, or another network access device capable of providing connectivity between two different network mediums. The input/output module 152 may be capable of sending or receiving signals via network 110. Moreover, the input/output module 152 may provide connectivity to one or more wired networks and may be capable of receiving signals on one medium such as a wired network and transmitting the received signals on a second medium such as a wireless network. The MEP module 154 may include various hardware and software components capable of creating discovery messages based on a predetermined MEP stored in the NID, using frames, such as, for example, ETH-VSP frames. The frames may be identified as belonging to a particular provider supported device using a unique identifier, such as an organizationally unique identifier (OUI) contained within the frame. The unique identifier may also be, for example, the source MAC address. The frames may be untagged or may contain one or more tags. For example, each frame may be tagged with a predefined C-Tag VLAN ID and/or a predefined S-Tag VLAN ID. The MEP module 154 may then send the discovery message(s) to the input/output module 152 for transmission to either a provider edge device 130.

The provider edge device 130 may include an input/output module 132 for sending and receiving data, a messaging module 134 for generating discovery response messages, and a content module 136 for processing the received delivery message(s) in order to obtain delivery message content data. The input/output module 132 may include various hardware and software components, such as, for example, a repeater, a microwave antenna, a cellular tower, or another network access device capable of providing connectivity between two different network mediums. The input/output module 132 may be capable of sending and/or receiving signals via network 110. Moreover, the input/output module 132 may provide connectivity to one or more wired networks and may be capable of receiving signals on one medium such as a wired network and transmitting the received signals on a second medium such as a wireless network. The messaging module 134 may include various hardware and software components, such as, for example, a processor, configured to generate discovery response messages in response to at least one received frame to relay to the input/output module 132, which may then transmit the discovery response message to the NID associated with the received frame(s). The discovery response message(s) may be of the same frame format as the received discovery message(s) which is being responded to. The content module 136 may include various hardware and software components, such as, for example, a processor, where the frame is stripped from the message to produce message content data. By way of example, the content module 136 may strip the ETH-VSP frame from the message. The content module 136 may then send the message content data to the input/output module 132 where the message content data may be transmitted to a NID management system 120.

The NID management system 120 may include an input/output module 122 for sending and receiving data, a discovery module 124 for determining the identification of a NID, and a configuration module 126 for determining a location and configuration of a NID. The input/output module 122 may include various hardware and software components, such as, for example, a repeater, a microwave antenna, a cellular tower, and/or another network access device capable of providing connectivity between two different network mediums. The input/output module 122 may be capable of sending and/or receiving signals via network 110. Moreover, the input/output module 122 may provide connectivity to one or more wired networks and may be capable of receiving signals on one medium such as a wired network and transmitting the received signals on a second medium such as a wireless network.

The discovery module 124 of the NID management system 120 may include various hardware and software components, such as, for example, data storage and a processor, for determining an identification number associated with a NID 150 based on message content data from the NID 150. For example, an identification number may be, for example, a serial number of the NID 150. The discovery module 124 may then use the identification number associated with the NID 150 to determine a location of the NID 150. The location and address of the NID 150 may be included in data storage. The address and location of the NID 150 may be linked to the NID serial number and/or MAC address, allowing a database search to be performed on the received NID serial number and/or MAC address to determine the address and/or location of the NID 150. The determined location and identification number associated with the NID 150 may then be stored and linked together in a data storage. The data storage included in the discovery module 124 may be network accessible storage and may be local, remote, or a combination thereof to network elements. Data storage may utilize a redundant array of inexpensive disks ("RAID"), tape, disk, a storage area network ("SAN"), an internet small computer systems interface ("iSCSI") SAN, a Fibre Channel SAN, a common Internet File System ("CIPS"), network attached storage ("NAS"), a network file system ("NFS"), or other computer accessible storage. In one or more embodiments, data storage may be a database, such as an Oracle database, a Microsoft SQL Server database, a DB2 database, a MySQL database, a Sybase database, an object oriented database, a hierarchical database, or other database. Data storage may utilize flat file structures for storage of data.

The configuration module 126 of the NID management system 120 may include various hardware and software components, such as, for example, a processor and a data storage, for determining configuration data for the NID 150 associated with the received content data. The configuration data may then be sent to the input/output module 122 for transmission to the provider edge device 130, where it may then be relayed to the appropriate NID 150. The data storage included in the configuration module 126 may be the same data storage of the discovery module 124. Alternatively, the data storage of the configuration module 126 may be separate data storage, but may include any of the configurations described above with respect to the discovery module data storage.

Figure 3A:
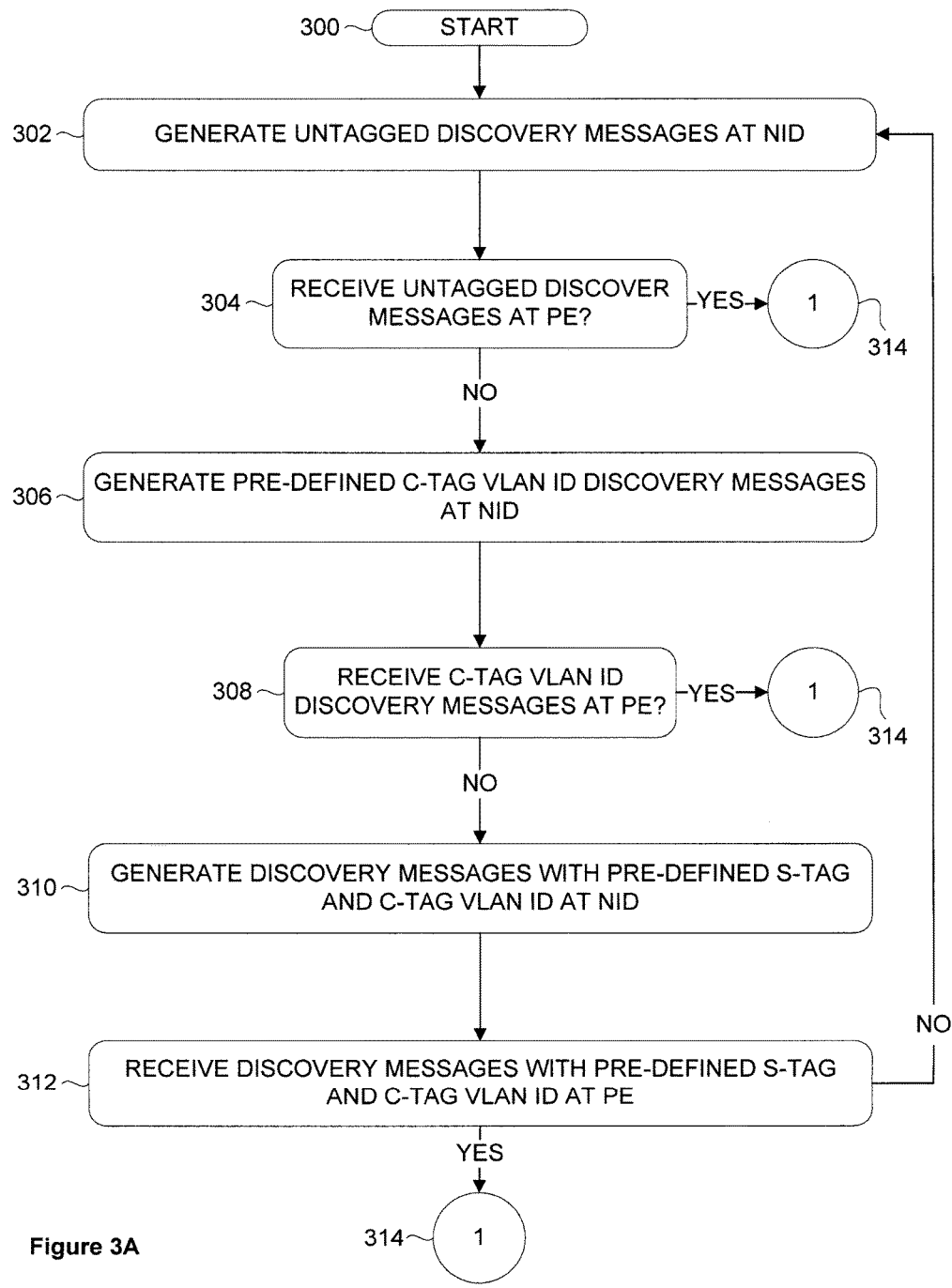
FIG. 3A is a flowchart illustrating discovery message generating and delivery according to a particular embodiment.

FIG. 3A is a flowchart illustrating discovery message generating and delivery according to a particular embodiment. The discovery message generation and delivery method of FIG. 3A begins at step 300, where a NID 150 is powered up.

At step 302, the NID 150 may generate untagged discovery message(s) using frames, such as, for example, ETH-VSP frames. A predetermined number of frames may be sent by the NID 150. For example, a NID 150 may send a burst of ten frames to a provider edge device 130.

In response to a provider edge device 130 receiving the discovery message(s) at step 304, the provider edge device 130 may generate discovery response message(s), which may then be sent to the NID 150, confirming a receipt of discovery message(s).

After generating the untagged discovery message(s) at step 302, the NID 150 may then wait a predetermined period of time for a response. By way of example, a NID 150 may wait anywhere from ten to sixty seconds for a response. If discovery message(s) are received at the provider edge device 130, the method may proceed to step 314. If discovery message(s) are not received and acknowledged according to step 318 described below within a predetermined period of time, the NID may then generate discovery message(s) with a pre-defined C-Tag VLAN ID using frames at step 306. For example, a NID 150 may send a burst of ten frames to a provider edge device 130.

In response to the provider edge device 130 receiving the discovery message(s) at step 308, the provider edge device 130 may generate a discovery response message, which may then be sent to the NID 150.

After generating the C-Tag VLAN ID discovery message at step 306, the NID 150 may then wait a predetermined period of time for a response. By way of example, a NID 150 may wait anywhere from ten to sixty seconds for a response. If discovery message(s) are received at the provider edge device 130, the method may proceed to step 314. If discovery message(s) are not received and acknowledged according to step 318 described below within a predetermined period of time, the NID may then generate discovery message(s) with a pre-defined C-Tag VLAN ID and a pre-defined S-Tag VLAN ID using frames at step 310. For example, a NID 150 may send a burst of ten frames to a provider edge device 130.

In response to the provider edge device 130 receiving the discovery message(s) at step 312, the provider edge device 130 may generate a discovery response message, which may then be sent to the NID 150. After generating the C-Tag/S-Tag VLAN ID discovery message at step 310, the NID 150 may then wait a predetermined period of time for a response. By way of example, a NID 150 may wait anywhere from ten to sixty seconds for a response.

If discovery message(s) are received at the provider edge device 130, the method may proceed to step 314. If discovery message(s) are not received and acknowledged according to step 318 described below within a predetermined period of time, the NID may repeat the above process, beginning at step 302 until discovery message(s) is received at a provider edge device 130. The process (steps 300-312) may be repeated a predefined amount of times, and where no response is acknowledged in that predefined amount of time, an alert and/or message may be sent from the NID management system to a predetermined maintenance system (not shown) to alert the maintenance system that manual intervention may be required. Once the alert and/or message is received, the NID 150 may then be manually configured for operation.

Figure 3B:
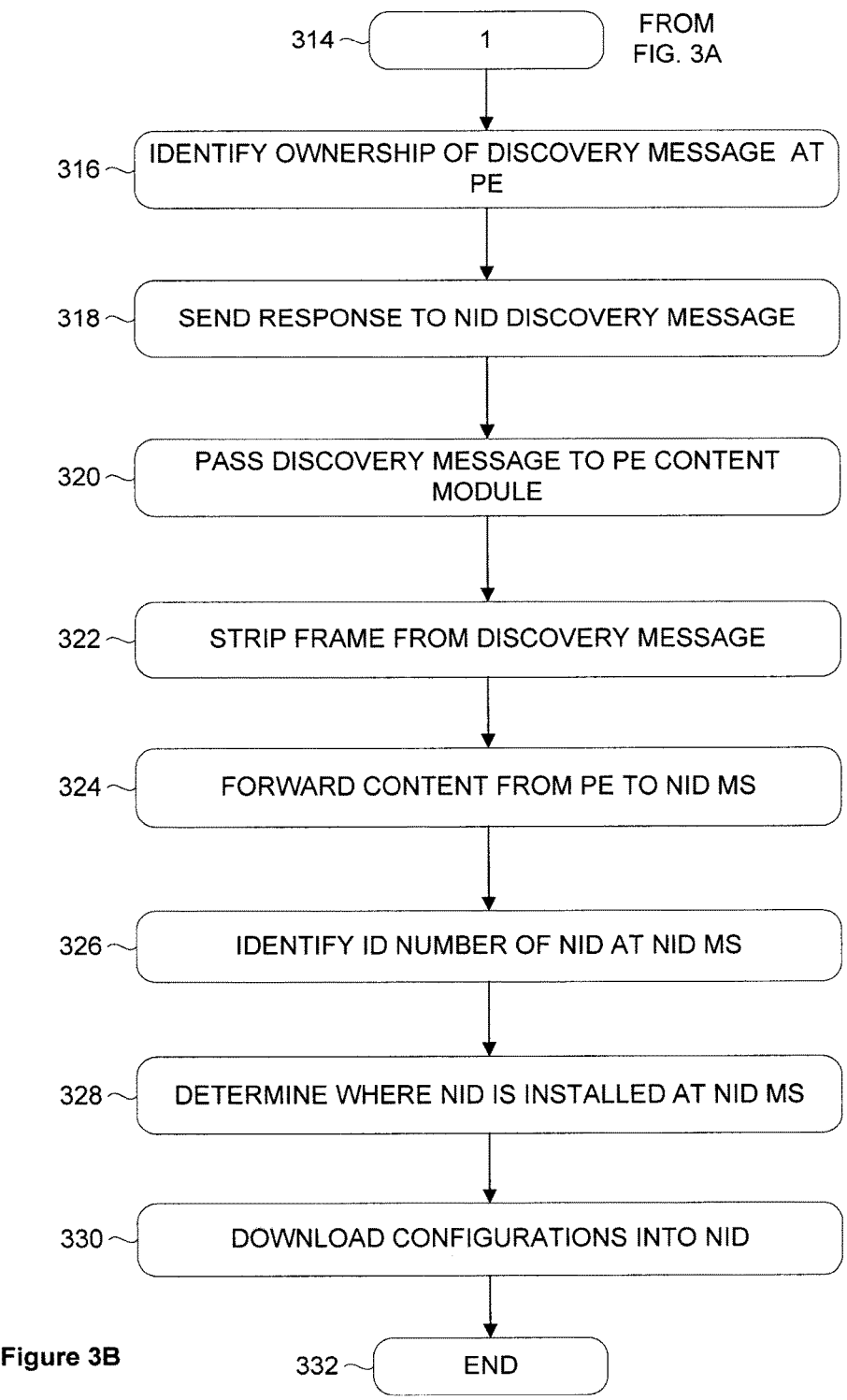
FIG. 3B is a flowchart illustrating the automated discovery and configuration of a network interface device according to a particular embodiment.

FIG. 3B is a flowchart illustrating the automated discovery and configuration of a NID according to a particular embodiment. The automated discovery and configuration of the NID may begin at step 314 after discovery message(s) have been received at the provider edge device 130. At step 316, the provider edge device 130 may identify ownership of the discovery message(s). For example, the provider edge device 130 may identify that frames of a received discovery message(s) belong to a particular provider via a unique identifier contained within a frame, such as, for example the source MAC address. At step 318, the provider edge device 130 may send a discovery response message to the NID 150 acknowledging receipt of the discovery message(s). The discovery response message is sent to the NID 150 using the same frame format as the received discovery message(s). At step 320, the received discovery message(s) may be sent to the content module 136 of the provider edge device 130. At step 322, the content module 136 may strip the frame(s) from the discovery message to obtain the message content data. For example, the content module 136 may strip the ETH-VSP frame from the discovery message.

At step 324, the contents of the frame may then be forwarded to a NID management system 120. At step 324, a discovery module 124 of the NID management system 120 may determine an identification number of the NID 150 associated with the received message content data. For example, a serial number associated with a NID may be determined using stored MEP data that is associated with the received message content data and stored serial number data that is mapped to the MEP data. The MEP data may be obtained from a data storage (not shown) within the NID management system 120.

At step 328, the discovery module 124 may also determine where the NID 150 is installed based on the received message content data. The determination of where the NID 150 is installed may be determined based on a received NID serial number and/or a received MAC code, which may then be used to query a database or data storage to discover the location. At step 330, the configuration module 126 of the NID management system 120 may determine the appropriate configurations to send to the NID 150 associated with message content data, the identification data determined in step 326, and the location data determined in step 328. The configurations may include the IPv4 or IPv6 address associated with the NID 150. Accordingly, the configuration data may be downloaded onto the NID 150. The configuration data may be passed between the provider edge device 130 until it reaches the MID 150 as content in frames, such as ETH-VSP frames. The configuration process may end at step 332 once the NID 150 is properly configured using the downloaded configuration data.

Once a NID 150 has been configured, the automated system may additionally be used for transmitting monitoring reports and alarm data. For example, reports and alarms may include fault management and performance monitoring, utilizing ITU-T Y.1731, which defines performance monitoring measurements such as frame, loss ratio, frame delay, and frame delay variation and connectivity fault management, utilizing IEEE 802.1ag, which defines standardized continuity checks, loopbacks, and link trace for fault management capabilities in enterprise and carrier networks. The same methods as presented in FIGS. 3A and 3B may be used, where monitoring and/or alarm data may be sent as part of the content data of discovery message(s). Moreover, where configuration data is sent from the NID management system 120 to the NID 150, the configuration data may include reconfiguration data and repair data. Reconfiguration data and/or repair data may be based on a determined refining or modifying of a configuration parameter that may be sent to the NID 150. The refining or modifying of the configuration parameter may be to enhance NID performance.

It is to be appreciated that the set of instructions, e.g., the software, which configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:
1. A network interface device, comprising:
one or more processors to:
transmit, to a provider edge device, a first discovery message that includes a first quantity of frames that are untagged,
the first quantity of frames being identified by an organizationally unique identifier (OUI), and
the first quantity of frames being transmitted in a burst of a predetermined quantity of frames to the provider edge device;
determine whether a response is received from the provider edge device, prior to a predetermined period of time, based on the first discovery message;
transmit, to the provider edge device, a second discovery message that includes a second quantity of frames with a customer tag identifier,
the customer tag identifier including a customer tag, virtual local area network (VLAN) identifier, and
the second discovery message being transmitted upon determining that the response is not received from the provider edge device, prior to the predetermined period of time, based on the first discovery message;
determine whether the response is received from the provider edge device, prior to the predetermined period of time, based on the second discovery message;
transmit, to the provider edge device, a third discovery message that includes a third quantity of frames with a service provider tag identifier,
the service provider tag identifier including a service provider tag, VLAN identifier, and
the third discovery message being transmitted upon determining that the response is not received from the provider edge device, prior to the predetermined period of time, based on the second discovery message;
repeat transmitting of the first discovery message, the second discovery message, and the third discovery message a predefined quantity of times or until the response is received from the provider edge device, prior to the predetermined period of time, based on one of the first discovery message, the second discovery message, or the third discovery message,
the provider edge device providing one of the first quantity of frames, the second quantity of frames, or the third quantity of frames to a management device when the provider edge device provides the response to the network interface device prior to the predetermined period of time;
receive configuration data from the management device based on the provider edge device providing the one of the first quantity of frames, the second quantity of frames, or the third quantity of frames to the management device, the configuration data being used to transmit monitoring reports and alarm data as part of content data, the monitoring reports and the alarm data including link trace information for determining fault management capabilities of a network, and the management device:

receiving the content data from the one of the first quantity of frames, the second quantity of frames, or the third quantity of frames, determining a unique identifier of the network interface device based on the content data, querying data storage, based on the content data and the unique identifier, to determine location data of the network interface device and the configuration data, and transmitting, to the network interface device, the configuration data based on the location data, the configuration data including an Internet Protocol (IP) version 4 address or an IP version 6 address associated with the network interface device, at least one of the first discovery message, the second discovery message, or the third discovery message including a pre-determined quantity of Ethernet vendor-specific frames, each of the pre-determined quantity of Ethernet vendor-specific frames including the unique identifier of the network interface device, and the configuration data including other Ethernet vendor-specific frames that are different than the pre-determined quantity of Ethernet vendor-specific frames; and install the configuration data in the network interface device.

2. The network interface device of claim 1, where the monitoring reports and the alarm data include at least one of:

fault management and performance monitoring information that include performance monitoring measurements, frame delay variation and connectivity fault management information that defines standardized continuity checks, or link trace information for determining fault management capabilities of the network.

3. The network interface device of claim 1, where each frame, of the first quantity of frames, the second quantity of frames, and the third quantity of frames, comprises:

a preamble or a start frame delimiter, an Ethernet header that includes destination and source addresses, payload data, serial number data, and a cyclic redundancy check.

4. The network interface device of claim 1, where the predetermined period of time is from about ten seconds to about sixty seconds.

5. The network interface device of claim 1, where the unique identifier and the location data are stored and linked together in data storage.

6. A system comprising:

a network interface device configured to:

transmit, to a provider edge device, a first discovery message that includes a first quantity of frames that are untagged, the first quantity of frames being identified by an organizationally unique identifier (OUI), and the first quantity of frames being transmitted in a burst of a predetermined quantity of frames to the provider edge device, determine whether a response is received from the provider edge device, prior to a predetermined period of time, based on the first discovery message, transmit, to the provider edge device, a second discovery message that includes a second quantity of frames with a customer tag identifier, the customer tag identifier including a customer tag, virtual local area network (VLAN) identifier, and the second discovery message being transmitted upon determining that the response is not received from the provider edge device, prior to the predetermined period of time, based on the first discovery message, determine whether the response is received from the provider edge device, prior to the predetermined period of time, based on the second discovery message, transmit, to the provider edge device, a third discovery message that includes a third quantity of frames with a service provider tag identifier, the service provider tag identifier including a service provider tag, VLAN identifier, and the third discovery message being transmitted upon determining that the response is not received from the provider edge device, prior to the predetermined period of time, based on the second discovery message;

repeat transmitting of the first discovery message, the second discovery message, and the third discovery message a predefined quantity of times or until the response is received from the provider edge device, prior to the predetermined period of time, based on one of the first discovery message, the second discovery message, or the third discovery message, the provider edge device providing one of the first quantity of frames, the second quantity of frames, or the third quantity of frames to a management device when the provider edge device provides the response to the network interface device prior to the predetermined period of time; and receive configuration data from the management device based on the provider edge device providing the one of the first quantity of frames, the second quantity of frames, or the third quantity of frames to the management device, the configuration data being used to transmit monitoring reports and alarm data as part of content data, the monitoring reports and the alarm data including link trace information for determining fault management capabilities of a network, and the management device:

receiving the content data from the first quantity of frames, the second quantity of frames, and the third quantity of frames, determining a unique identifier of the network interface device, determined by the management device based on the content data, querying data storage, based on the content data and the unique identifier, to determine location data of the network interface device and the configuration data, and transmitting the configuration data, based on the location data, to the network interface device for installation, the configuration data including an Internet Protocol (IP) version 4 address of an IP version 6 address associated with the network interface device, at least one of the first discovery message, the second discovery message, or the third discovery message including a pre-determined quantity of Ethernet vendor-specific frames, each of the pre-determined quantity of Ethernet vendor-specific frames including the unique identifier of the network interface device, and the configuration data including other Ethernet vendor-specific frames that are different than the pre-determined quantity of Ethernet vendor-specific frames.

7. The system of claim 6, where the monitoring reports and the alarm data include at least one of:

fault management and performance monitoring information that include performance monitoring measurements, frame delay variation and connectivity fault management information that defines standardized continuity checks, or link trace information for determining fault management capabilities of the network.

8. The system of claim 6, where each frame, of the first quantity of frames, the second quantity of frames, and the third quantity of frames, comprises:

a preamble or a start frame delimiter, an Ethernet header that includes destination and source addresses, and payload data.

9. The system of claim 6, where the unique identifier and the location data are stored and linked together in data storage.

10. The system of claim 6, where the network interface device is further configured to:

install the configuration data in the network interface device.

11. The system of claim 6, where the predetermined period of time is from about ten seconds to about sixty seconds.

12. The system of claim 6, where the monitoring reports and the alarm data include at least one of:

fault management and performance monitoring information that include performance monitoring measurements, frame delay variation and connectivity fault management information that defines standardized continuity checks, or link trace information for determining fault management capabilities of the network.

13. A method comprising:

transmitting, by a network interface device and to a provider edge device, a first discovery message that includes a first quantity of frames that are untagged, the first quantity of frames being identified by an organizationally unique identifier (OUI), and the first quantity of frames being transmitted in a burst of a predetermined quantity of frames to the provider edge device;

determining, by the network interface device, whether a response is received from the provider edge device, prior to a predetermined period of time, based on the first discovery message;

transmitting, by the network interface device and to the provider edge device, a second discovery message that includes a second quantity of frames with a customer tag identifier, the customer tag identifier including a customer tag, virtual local area network (VLAN) identifier, and the second discovery message being transmitted upon determining that the response is not received from the provider edge device, prior to the predetermined period of time, based on the first discovery message;

determining, by the network interface device, whether the response is received from the provider edge device, prior to the predetermined period of time, based on the second discovery message;

transmitting, by the network interface device and to the provider edge device, a third discovery message that includes a third quantity of frames with a service provider tag identifier, the service provider tag identifier including a service provider tag, VLAN identifier, and the third discovery message being transmitted upon determining that the response is not received from the provider edge device, prior to the predetermined period of time, based on the second discovery message;

repeating, by the network interface device, transmitting of the first discovery message, the second discovery message, and the third discovery message a predefined quantity of times or until the response is received from the provider edge device, prior to the predetermined period of time, based on one of the first discovery message, the second discovery message, or the third discovery message, the provider edge device providing one of the first quantity of frames, the second quantity of frames, or the third quantity of frames to a management device when the provider edge device provides the response to the network interface device prior to the predetermined period of time; and receiving, by the network interface device and from the management device, configuration data based on the provider edge device providing the one of the first quantity of frames, the second quantity of frames, or the third quantity of frames to the management device, the configuration data being used to transmit monitoring reports and alarm data as part of content data, the monitoring reports and the alarm data including link trace information for determining fault management capabilities of a network, and the management device:

receiving the content data from the one of the first quantity of frames, the second quantity of frames, or the third quantity of frames, determining a unique identifier of the network interface device based on the content data, querying data storage, based on the content data and the unique identifier, to determine location data of the network interface device and the configuration data, and transmitting, to the network interface device, the configuration data based on the location data,
the configuration data including an Internet Protocol (IP) version 4 address or an IP version 6 address associated with the network interface device, at least one of the first discovery message, the second discovery message, or the third discovery message including a pre-determined quantity of Ethernet vendor-specific frames,
each of the pre-determined quantity of Ethernet vendor-specific frames including the unique identifier of the network interface device, and
the configuration data including other Ethernet vendor-specific frames that are different than the pre-determined quantity of Ethernet vendor-specific frames.

14. The method of claim 13, where the monitoring reports and the alarm data include at least one of:
fault management and performance monitoring information that include performance monitoring measurements,
frame delay variation and connectivity fault management information that defines standardized continuity checks, or
link trace information for determining fault management capabilities of the network.

15. The method of claim 14, where each frame, of the first quantity of frames, the second quantity of frames, and the third quantity of frames, comprises:
a preamble;
an Ethernet header; and
payload data.

16. The method of claim 13, further comprising:
installing the configuration data in the network interface device.

17. The method of claim 13, where the predetermined period of time is from about ten seconds to about sixty seconds.

18. The method of claim 13, where the unique identifier and the location data are stored and linked together in data storage.

19. The method of claim 13, where the monitoring reports and the alarm data include at least one of:
fault management and performance monitoring information that include performance monitoring measurements,
frame delay variation and connectivity fault management information that defines standardized continuity checks or loopbacks, or
link trace information for determining fault management capabilities of the network.

20. A non-transitory computer readable medium for storing instructions, the instructions comprising:
one or more instructions that, when executed by one or more processors of a network interface device, cause the one or more processors to:
transmit, to a provider edge device, a first discovery message that includes a first quantity of frames that are untagged,
the first quantity of frames being identified by an organizationally unique identifier (OUI), and
the first quantity of frames being transmitted in a burst of a predetermined quantity of frames to the provider edge device;
determine whether a response is received from the provider edge device, prior to a predetermined period of time, based on the first discovery message;
transmit, to the provider edge device, a second discovery message that includes a second quantity of frames with a customer tag identifier,
the customer tag identifier including a customer tag, virtual local area network (VLAN) identifier, and
the second discovery message being transmitted upon determining that the response is not received from the provider edge device, prior to the predetermined period of time, based on the first discovery message;
determine whether the response is received from the provider edge device, prior to the predetermined period of time, based on the second discovery message;
transmit, to the provider edge device, a third discovery message that includes a third quantity of frames with a service provider tag identifier,
the service provider tag identifier including a service provider tag, VLAN identifier, and
the third discovery message being transmitted upon determining that the response is not received from the provider edge device, prior to the predetermined period of time, based on the second discovery message;
repeat transmitting of the first discovery message, the second discovery message, and the third discovery message a predefined quantity of times or until the response is received from the provider edge device, prior to the predetermined period of time, based on one of the first discovery message, the second discovery message, or the third discovery message,
the provider edge device providing one of the first quantity of frames, the second quantity of frames, or the third quantity of frames to a management device when the provider edge device provides the response to the network interface device prior to the predetermined period of time;
receive configuration data from the management device based on the provider edge device providing the one of the first quantity of frames, the second quantity of frames, or the third quantity of frames to the management device,
the configuration data being used to transmit monitoring reports and alarm data as part of content data,
the monitoring reports and the alarm data including link trace information for determining fault management capabilities of a network, and
the management device:
receiving the content data from the one of the first quantity of frames, the second quantity of frames, or the third quantity of frames,
determining a unique identifier of the network interface device based on the content data,
querying data storage, based on the content data and the unique identifier, to determine location data of the network interface device and the configuration data, and
transmitting, to the network interface device, the configuration data based on the location data, the configuration data including an Internet Protocol (IP) version 4 address or an IP version 6 address associated with the network interface device, at least one of the first discovery message, the second discovery message, or the third discovery message including a pre-determined quantity of Ethernet vendor-specific frames, each of the pre-determined quantity of Ethernet vendor-specific frames including the unique identifier of the network interface device, and the configuration data including other Ethernet vendor-specific frames that are different than the pre-determined quantity of Ethernet vendor-specific frames; and install the configuration data in the network interface device.

21. The non-transitory computer readable medium of claim 20, where the unique identifier and the location data are stored and linked together in data storage.

22. The non-transitory computer readable medium of claim 20, where the monitoring reports and the alarm data include at least one of:

fault management and performance monitoring information that include performance monitoring measurements, frame delay variation and connectivity fault management information that defines standardized continuity checks, or link trace information for determining fault management capabilities of the network.

* * * * *